UNITED STATES PATENT OFFICE.

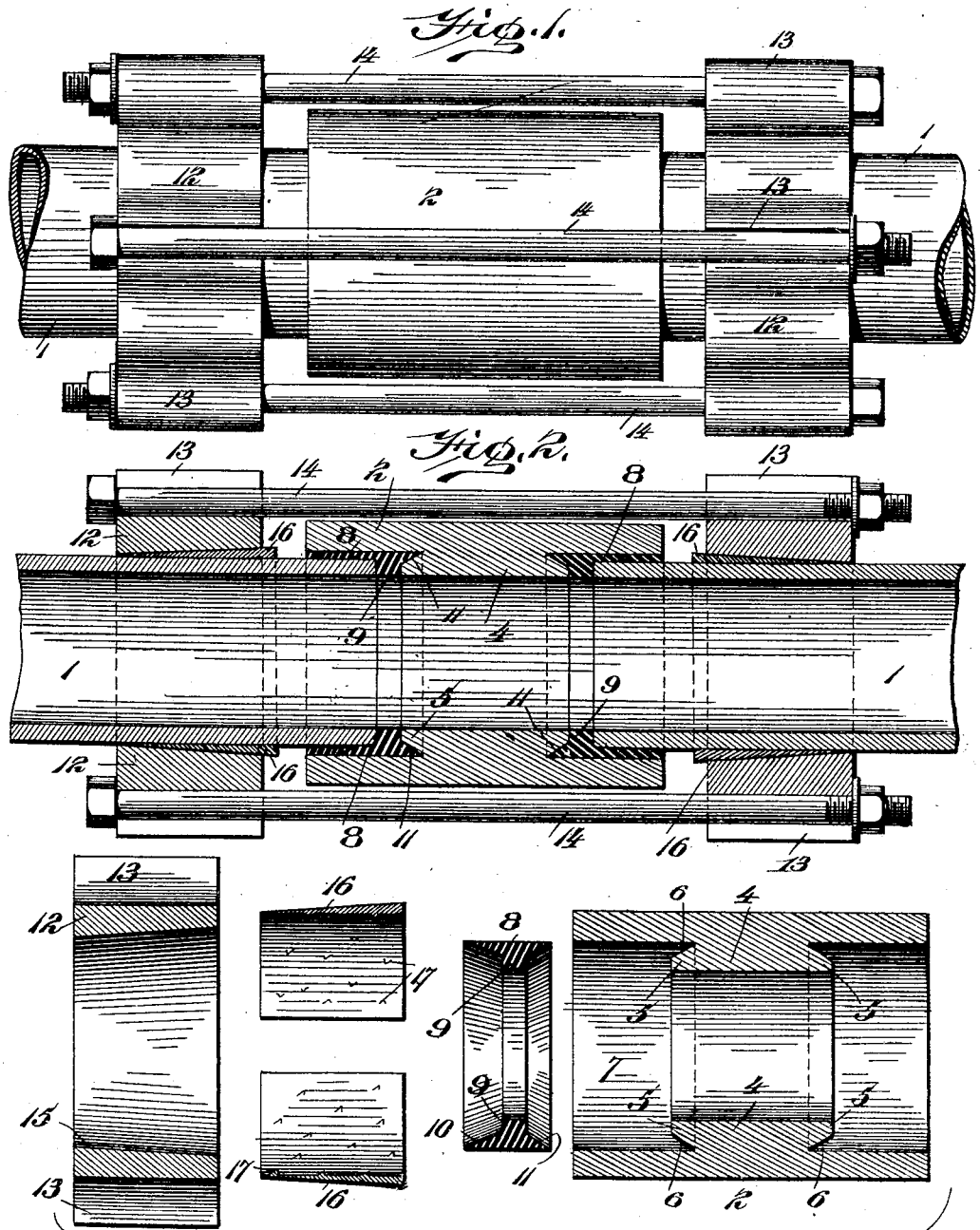

AUSTIN T. HERRICK, OF BRADFORD, PENNSYLVANIA.

PIPE-COUPLING.

No. 808,923.　　　Specification of Letters Patent.　　　Patented Jan. 2, 1906.

Application filed September 15, 1904. Serial No. 224,522.

*To all whom it may concern:*

Be it known that I, AUSTIN T. HERRICK, a citizen of the United States, residing at Bradford, in the county of McKean, State of Pennsylvania, have invented certain new and useful Improvements in Pipe-Couplings, of which the following is a specification.

In the drawings, Figure 1 is an elevation of a pipe-coupling embodying my invention. Fig. 2 is a longitudinal section of the same. Fig. 3 is a similar sectional view of the same parts segregated.

1 represents the pipes broken away.

2 represents the sleeve forming a part of my invention provided on its interior with an annular projection 4, upon the ends of which are formed square seats or shoulders 5, from the inner edge of which extend wedge-shaped grooves 6. As will be seen from the several figures, the bore 7 at the end of the sleeve is of greater diameter than the diameter of its bore in the annular projection 4. 8 is an annular packing-ring of a diameter commensurate with the diameter of the large bore of the sleeve 2, said packing-ring having an annular projection 9, from each side of which the ring is beveled outwardly toward its respective ends, the bevel 10 being much longer than the bevel 11. These bevels form wedge-shaped ends for the packing-ring, the longer of which receives the end of the pipe and surrounds the same, the shorter of which is adapted to be seated in the wedge-shaped groove 6, while the face of the projection 9 adjacent the shorter bevel is seated upon the square face or seat 5 in the annular projection 4 in the sleeve 2, and the outer faces of the two wedge-shaped portions are in alinement.

The collar 12 is provided with projections 13, in which the bolts 14 are seated, as shown in Figs. 1 and 2. The collar 12 is provided with a wedge-shaped bore 15, in which the slips 16 are adapted to be fitted, said slips being provided with wickers 17 upon their inner faces. As shown in the drawings, these wickers are wedge-shaped in cross-section.

In assembling the parts the collars are first placed upon the pipe, the packing-rings 8 are seated in the ends of the sleeve 2, and the ends of the pipe then inserted within the packing-rings and the bolts 14 placed in position upon said collars. Upon turning the nuts on the bolts the collars are drawn upon the slips 16, which by reason of the wickers 17 bight into the exterior surface of the pipe, which, in addition to the wedge-shaped construction of the collars and the slips, forms a more rigid connection between the collars and the pipe. Upon further manipulation of the nuts the pipes are drawn toward each other, thus forcing said ends into the packing-rings 8, thereby compressing said packing-rings not only between the ends of the pipe and the annular projection 4, but between the circumference and the inner faces of the sleeve 26, spreading the resilient material of which the packing-ring is composed compactly between the pipe and the sleeve and forming a fluid-tight joint.

It is obvious that slight changes may be made in the details of construction without departing from the spirit of this invention. Hence I would have it understood that I do not confine myself to the exact details of construction shown.

Having described my invention, what I claim as new therein is—

1. The combination with a sleeve having an interior annular projection having seats at its ends, of pipes fitted within the ends of the sleeves having greater diameters than the bore of the annular projection, packings adapted to receive the ends of the pipes and surround the same and having annular projections fitting between the seat and the end of the pipe, and means separable from the pipe for gripping the pipes and forcing them against the annular projection of the packing.

2. The combination with the sleeve having an annular shoulder therein, of a packing adapted to receive the end of a pipe of greater diameter than the bore of the annular shoulder, and having an annular projection adapted to extend between the shoulder and the end of the pipe, and means separable from the pipe adapted to grip a pipe and force it against the projecting portion of the packing.

3. In a pipe-coupling, a sleeve having a central bore enlarged at each end, a square seat and a wedge-shaped groove formed at the juncture of the central and enlarged bores.

4. In a pipe-coupling, the combination with a sleeve having a square seat and a wedge-shaped groove formed in its interior, of a packing-ring comprising an annular rectangular projection and beveled portions extending each side of the projection, said ring adapted to fit within said sleeve.

5. In a pipe-coupling, a packing-ring comprising a rectangular portion and wedge-shaped portions of different length extending from each side of the rectangular portion the outer faces of the wedge-shaped portions being in alinement.

6. In a pipe-coupling, the combination with a sleeve having a central and enlarged end portions, square seats and wedge-shaped grooves formed at the juncture of said bores, packing-rings each having a central rectangular portion and wedge-shaped portions of different length extending from each side of the rectangular portion, the shorter of the beveled portions being adapted to be seated in the wedge-shaped groove formed within the sleeve, of collars having a tapering bore and slips adapted to fit within said tapering bore and provided with wickers upon their inner faces.

7. The combination with the sleeve, of an annular shoulder or seat therein, provided with an annular groove, and a packing adapted to receive the end of a pipe and surround the same, having a portion adapted to enter the annular groove, and an annular portion adapted to extend between the end of the pipe and the seat or shoulder.

8. The combination with the sleeve having an annular shoulder therein; of a packing abutting against the shoulder and having a tapering pipe-receiving bore to receive the end of a pipe, and an annular projection at the smaller end of the bore; and means for forcing the pipe in the packing.

9. In a pipe-coupling, the combination with a member having a cylindrical bore; of a packing having a cylindrical portion to fit the bore of said member, a tapering bore, and a shoulder at the smaller end of the bore; a second member adapted to fit within the tapering bore of the packing and abut against the shoulder; and means for forcing the second member within the tapering bore of the packing to cause the packing to be pressed against the cylindrical bore of the first member.

The foregoing specification signed this 10th day of September, 1904.

AUSTIN T. HERRICK.

In presence of—
 EDWIN S. CLARKSON,
 M. B. HAYES.